No. 748,095. PATENTED DEC. 29, 1903.
D. M. PFAUTZ.
WATER FILTERING SYSTEM.
APPLICATION FILED MAR. 24, 1903.
NO MODEL. 3 SHEETS—SHEET 3.
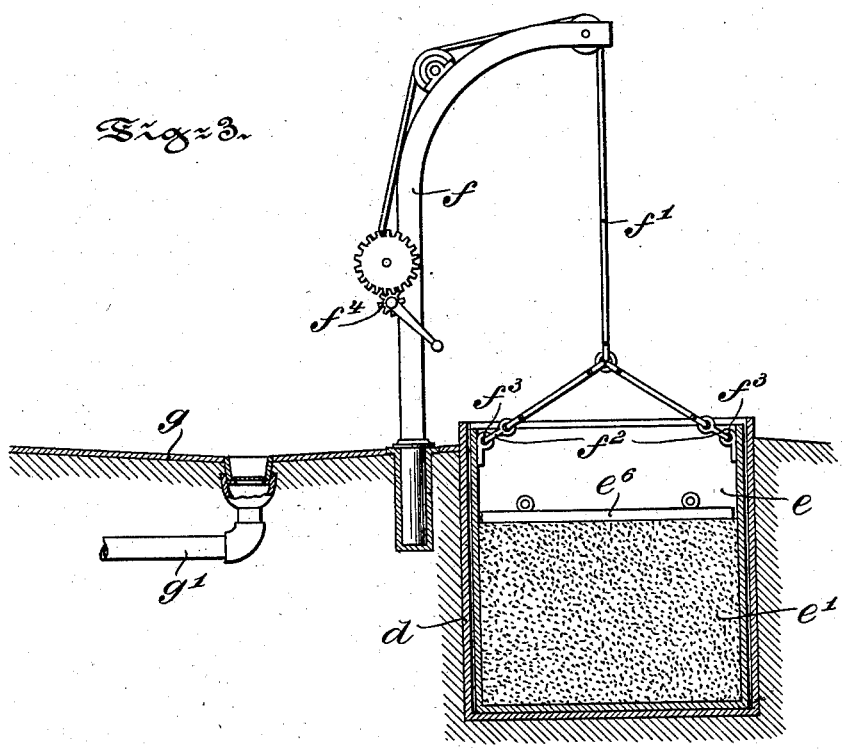
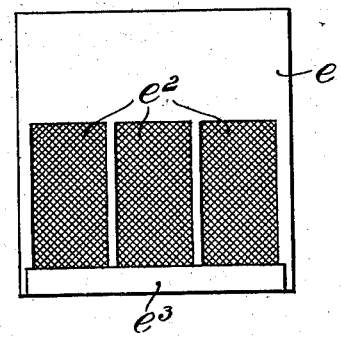

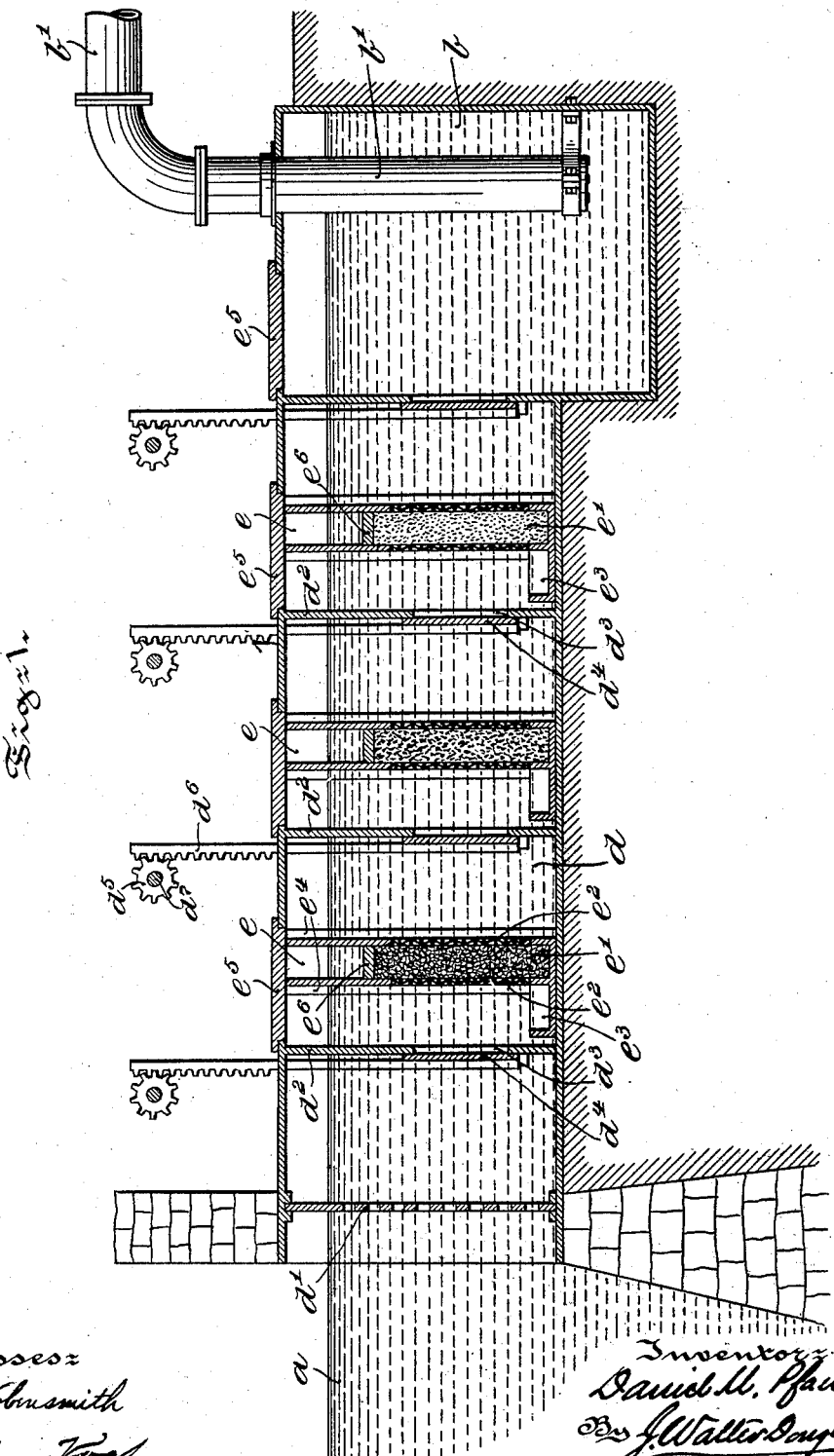

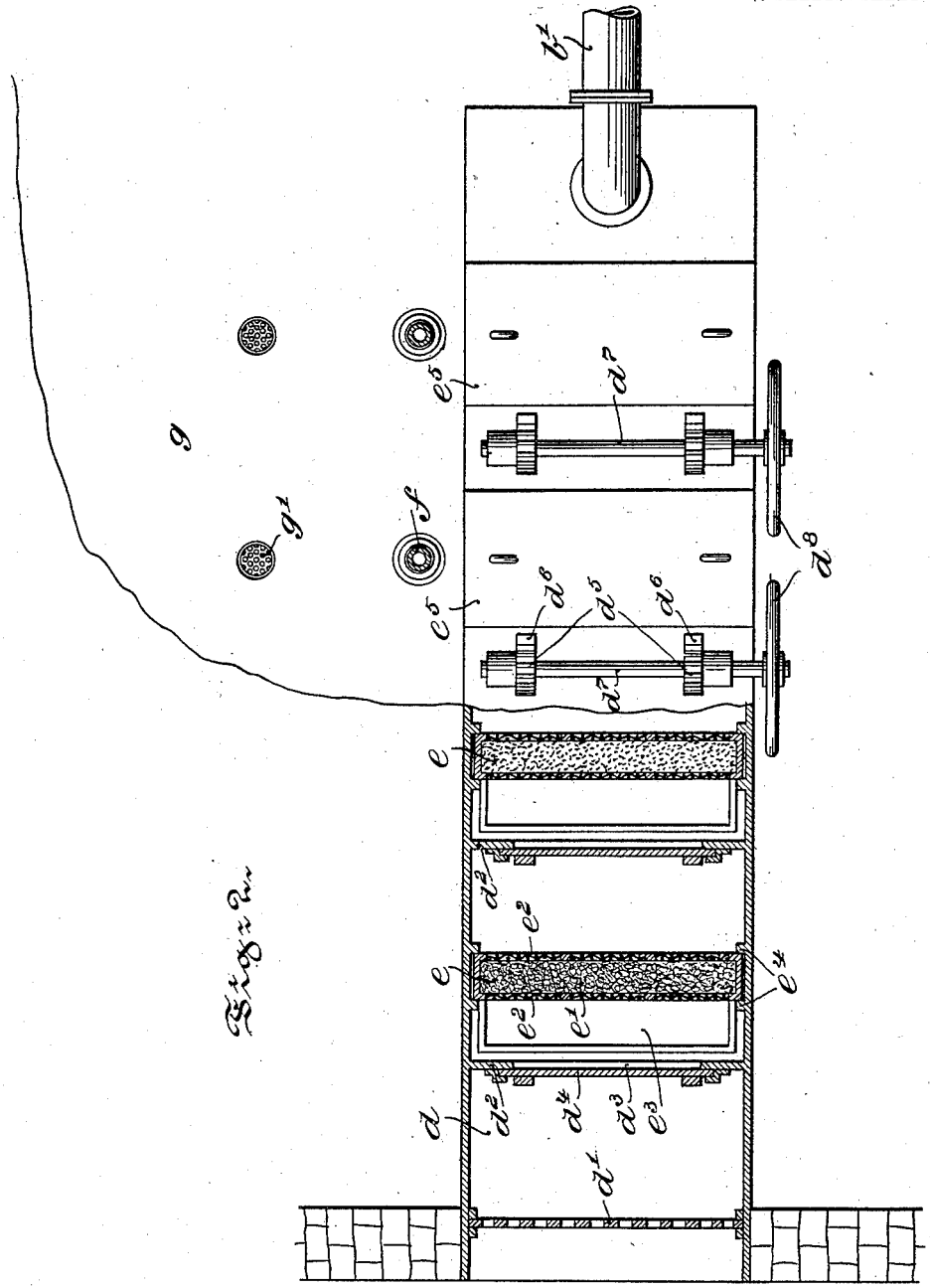

No. 748,095. Patented December 29, 1903.

UNITED STATES PATENT OFFICE.

DANIEL M. PFAUTZ, OF GERMANTOWN, PENNSYLVANIA.

WATER-FILTERING SYSTEM.

SPECIFICATION forming part of Letters Patent No. 748,095, dated December 29, 1903.

Application filed March 24, 1903. Serial No. 149,242. (No model.)

*To all whom it may concern:*

Be it known that I, DANIEL M. PFAUTZ, a citizen of the United States, residing at Germantown, in the county of Philadelphia and State of Pennsylvania, have invented certain new and useful Improvements in Water-Filtering Systems, of which the following is a specification.

My invention has relation to a system for water filtration especially adapted for the purification of the water-supply of cities, towns, and other large consumers; and in such connection it relates to the construction and arrangement of parts whereby said system may be successfully and efficiently carried out.

The principal object of my invention is to provide a system for water filtration wherein the impure water from the river, lake, or other prime source is conveyed through a channel to a pump-chamber, traversing successively a series of transverse filter compartments or partitions, dividing the channel into a series of chambers, the water flowing through the filter-partitions and being relieved thereby of its impurities before it reaches the pump-chamber.

The nature and scope of my invention will be more fully understood from the following description, taken in connection with the accompanying drawings, forming part hereof, in which—

Figure 1 is a longitudinal sectional view of a filtering apparatus or plant designed to carry out the process embodying my invention. Fig. 2 is a top or plan view, partly in horizontal section, of said apparatus or plant. Fig. 3 is a cross-sectional view of Fig. 1, showing in elevation the means for removing a filter compartment or partition from the channel; and Fig. 4 is a face view of one of the filter compartments or partitions detached from the apparatus.

Referring to the drawings, $a$ represents a river, lake, or other prime source of water-supply, and $b$ the pump-chamber, from which the purified and filtered water is removed through the offtake or inlet pipe $b'$ of a pump. (Not shown.) Between the prime source $a$ and the pump-chamber $b$ is arranged a channel or conduit $d$, formed, preferably, of metal. At the end of the conduit or channel $d$ nearest the source $a$ is arranged a heavy grating or screen-plate $d'$, through which the water must pass before it can enter the conduit or channel $d$. The conduit or channel $d$ is divided into a series of compartments or chambers by means of transverse stationary walls $d^2$, having at or near their base an opening $d^3$, normally closed by a valve $d^4$ of suitable form. In the drawings the valves $d^4$ are illustrated as gate-valves sliding up and down on the stationary walls $d^2$ and are raised and lowered by pinions $d^5$, working in racks $d^6$, secured to the valves $d^4$. The pinions $d^5$ turn with a shaft $d^7$, normally operated by a hand-wheel $d^8$, as clearly illustrated in Figs. 1 and 2.

In each of the chambers formed in the conduit or channel $d$ is located a transversely-arranged filter compartment or partition $e$. The filter-partition $e$ is preferably in the shape of a box, within which the filter material $e'$ is packed, the front and rear faces of the partition $e$ being grated or perforated, as at $e^2$, to form a screen, through which and the filter material the water travels as it enters and leaves a compartment or chamber of the conduit $d$. The preferred construction of the box $e$ is such that its base is extended, as at $e^3$, to form a pan or receptacle for loose impurities deposited from the filter boxes or partitions as well as from the water, and the side walls of the conduit $d$ are grooved or flanged, as at $e^4$, to permit the filter-box $e$ to be raised in the conduit $d$ and to be wholly removed therefrom whenever necessary. The top of the filter box or partition $e$ is normally closed by a water-tight lid $e^5$, and upon the filter material $e'$ within each box or partition $e$ rests a second lid $e^6$ of sufficient weight to hold the material $e'$ down in the box or partition $e$ and to prevent its disarrangement by flotation.

Adjacent to each filter box or partition $e$ is arranged a crane or derrick $f$, having the rope $f'$ and hooks $f^2$ arranged to enter eyebolts $f^3$, secured, preferably, to the side walls of the filter box or partition $e$, as clearly illustrated in Fig. 3. By turning the winch $f^4$ the rope $f'$ and filter-box $e$ are raised until the box $e$ clears the top of the conduit $d$. The box $e$ may then be moved by turning the crane $f$ until it rests upon the washing-platform $g$ adjacent to the conduit $d$. When the box $e$ is flushed and cleansed upon this platform $g$, the impurities are drained off through suitable drain-pipes $g'$, and the box or partition $e$ may be replaced in the conduit $d$.

In the operation of the system when the filter boxes or partitions $e$ are in place within the conduit $d$ the gate-valves $d^4$ are opened, and the water flows from the source $a$ through successive compartments of the conduit and through the filter boxes or partitions $e$, arranged in these compartments. The screened openings of the filters $e$ are arranged below the normal water-level, and the water is thus forced to travel through the filter material before it can enter a chamber of the conduit guarded by said filter material. The heavy impurities are screened from the water by the face of the filter boxes or partitions $e$ and fall by gravity into the catch pans or basins $e^3$. The flow of the water is normally by gravity, although it is assisted by the pumping of the water away from the pump-chamber $b$.

The boxes or partitions $e$ may be filled with filter material $e'$ of any preferred composition, substances, or materials. In practice it will be found that a regulation of the porosity of the filter material will insure the best results, or, in other words, the filter partitions $e$ should be so arranged that they will successively catch smaller and smaller impurities as the pump-chamber $b$ is approached.

When any or all of the filter boxes or partitions are to be removed from the conduit $d$ for cleansing or replenishing or for any other purpose, the gate-valves $d^4$ are preferably all closed, and the flow of water through the conduit $d$ will cease. It is of course to be understood that, if desired, only one gate-valve $d^4$ need be closed when only one box or partition is to be removed and that gate-valve $d^4$ will be the one immediately in front of the box or partition $e$ to be removed.

Having thus described the nature and object of my invention, what I claim as new, and desire to secure by Letters Patent, is—

1. In a system of water filtration, a conduit having a series of stationary walls, each open near its base, said walls dividing the conduit into a series of compartments and a series of transverse filter-partitions arranged in the several compartments of the conduit adjacent to and covering the openings in the stationary walls.

2. In a system of water filtration, a conduit having a series of stationary walls, each open near its base, said walls dividing the conduit into a series of compartments, a series of transverse filter-partitions each removably arranged in each of said compartments adjacent to and covering the openings in said walls, and means for removing each filter-partition independently of the other filter-partitions.

3. In a system for water filtration, a conduit having a series of stationary walls each open near its base dividing the conduit into a series of compartments, a valve arranged to control the opening of each wall, and a series of transverse filter-partitions respectively arranged in the several compartments of the conduit adjacent to the openings in the stationary walls.

4. In a system for water filtration, a filter compartment or partition, comprising a box for the reception of the filter material, a screen forming the front and rear face of said box, and a catch-pan arranged at the base of the box and projecting from one face of said box.

In testimony whereof I have hereunto set my signature in the presence of two subscribing witnesses.

DANIEL M. PFAUTZ.

Witnesses:
J. WALTER DOUGLASS,
THOMAS M. SMITH.